United States Patent [19]
Rubio et al.

[11] 3,750,467
[45] Aug. 7, 1973

[54] DEVICE TO MEASURE COMPRESSIBILITY OF SOFT MATERIALS

[75] Inventors: Manuel Jesus Rubio, Bridgeport, Conn.; Victor Mario Leal, Monterrey, N.L., Mexico

[73] Assignee: Roberto Gonzalez Barrera, Monterrey, N.L., Mex.

[22] Filed: Nov. 3, 1971

[21] Appl. No.: 195,314

[52] U.S. Cl. ................................ 73/169, 73/94
[51] Int. Cl. ..................... G01n 3/08, G01n 33/10
[58] Field of Search .................. 73/432 R, 169, 78, 73/81, 85, 94, 150, 88 R

[56] References Cited
UNITED STATES PATENTS
| | | | |
|---|---|---|---|
| 2,638,779 | 5/1953 | Wilson | 73/81 X |
| 2,267,561 | 12/1941 | Halton | 73/169 |
| 2,347,082 | 4/1944 | Claus | 73/169 |
| 2,975,631 | 3/1961 | Hansen | 73/169 X |

*Primary Examiner*—Richard C. Queisser
*Assistant Examiner*—Joseph W. Roskos
*Attorney*—Joseph Gray Jackson et al.

[57] ABSTRACT

In testing soft materials, particularly tortilla cooked corn, the invention provides a simple device having a vertical cylinder cooperating with a vertical piston and means to apply a starting weight. A crosshead and crosshead guides assure satisfactory operation of the piston without binding. Weights in one position float on the crosshead guides held by latches and in another position apply their load to the crosshead guides, the crosshead and the piston. To permit insertion of the cylinder and the sample a latch is provided to hold the crosshead and the piston in inoperative position, to remove or insert the cylinder and to substitute samples.

3 Claims, 3 Drawing Figures

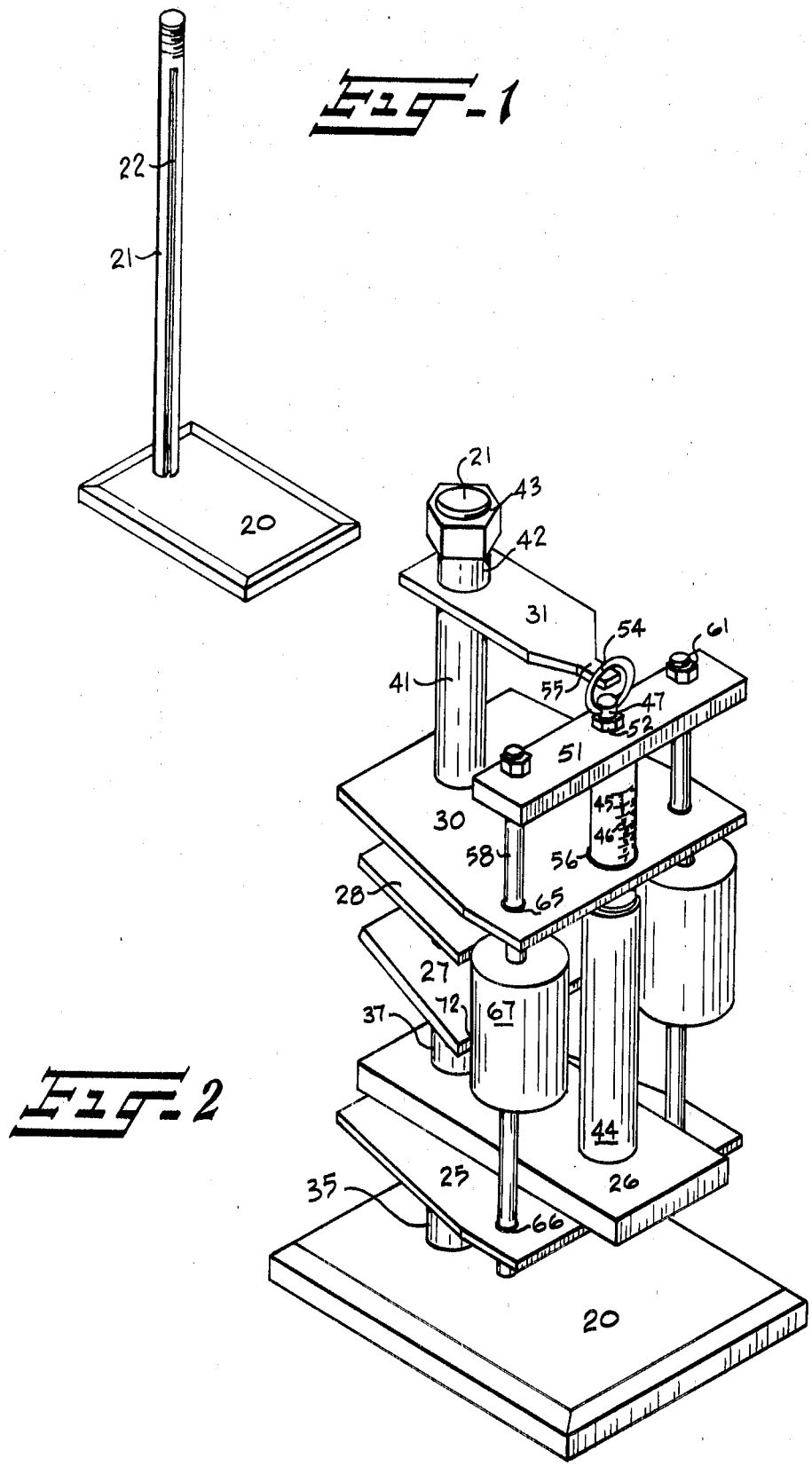

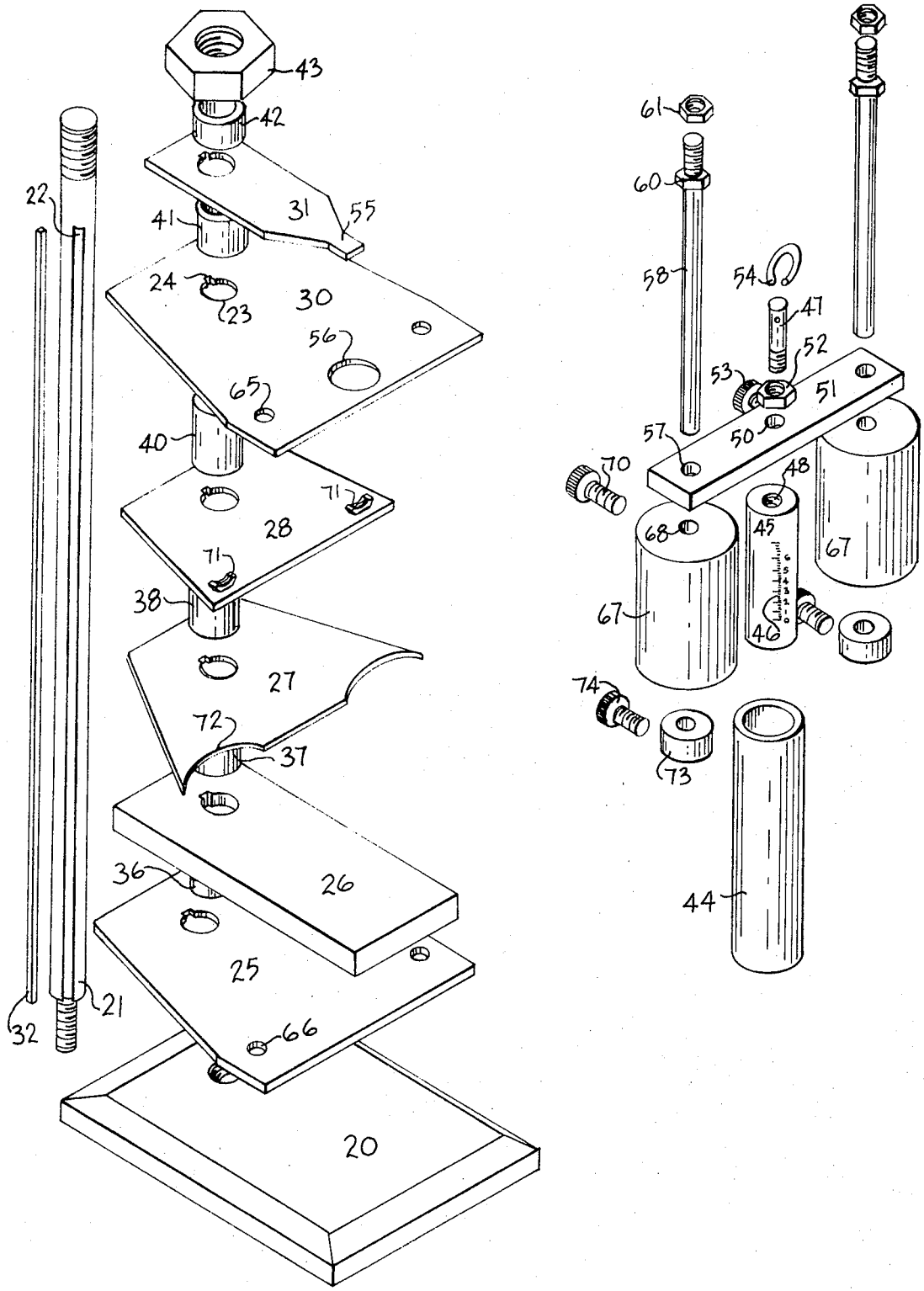

DEVICE TO MEASURE COMPRESSIBILITY OF SOFT MATERIALS

DISCLOSURE OF THE INVENTION

The invention relates to a device for testing the softness and compressibility of materials such as cooked or moist grains, and food products made therefrom, such as doughs, and is particularly applicable to products used in the manufacture of tortillas, though it is also applicable to other food products and other soft materials.

In the making of tortillas and of flour for tortillas, corn is used as the raw material. It is nixtamilized by cooking in lime water to gelatinize the starch and give to the corn peculiar properties necessary for tortillas. The cooked corn must be ground either to transform it directly to tortilla dough and eventually to tortillas, or to dehydrate it to make flour. In the processing of cooked corn in industrial quantities, it is very necessary to measure the hardness or softness of the cooked corn. This measurement is useful for control purposes and for research to replace various rule of thumb methods, such as testing the corn grains by biting to determine hardness. Testing by biting may be a very accurate method when performed by someone of great experience, but it is not applicable to an industry that must produce tortillas 24 hours a day, with various control workers who have different ideas of softness and hardness of corn. One worker may produce a very soft and overcooked corn, while another worker turns out a very hard and harsh corn.

Accordingly, in this industry it is very desirable to have an objective standard of softness of the completed corn to eliminate an inferior and non-uniform product.

A similar problem exists in other industries and there is a desire to test hardness of soft materials generally. The invention is particularly applicable to testing the compressibility of other cereals and other granular materials.

In the drawings we have shown an illustrative embodiment of our invention.

FIG. 1 is a perspective of the base and supporting column.

FIG. 2 is a perspective of a completed machine of the invention.

FIG. 3 is an exploded perspective of the machine of the invention.

A base 20 supports a suitably shaft-like column 21 which is vertical. The column has a keyway 22 and is surrounded by circular openings 23 having keyways 24 of a series of brackets 25, 26, 27, 28, 30 and 31. The various brackets are prevented from turning and are kept straight by a key 32 extending through the keyways from top to bottom. The brackets are spaced by spacer rings 35, 36, 37, 38, 40 and 41 around the column and above the uppermost bracket 31 there is spacer ring 42 and the entire structure is held together by a nut 43 attached to threads on top of the column. A vertical hollow cylinder 44 is rested on cylinder support bracket 26 as shown, and it is filled with sample with vibration. Within the cylinder adequately fitting it there is inserted a piston 45 which will move down in the cylinder and which has a scale 46 to measure its range of movement.

The piston 45 is attached to screw 47 in threaded opening 48 in the piston, and the screw passes through opening 50 in a crosshead 51, the screw being held by a nut 52 and a set screw 53. There is a ring 54 attached to the upper end of the screw 47 which in raised position hooks over latching projection 55 of crosshead latching bracket 31 to hold the crosshead and piston raised. The piston passes through opening 56 in guide bracket 30. The crossheads at opposite ends have vertical openings 57 through which guide rods 58 pass, the guide rods at their threaded ends being anchored by nuts 60 and 61 above and below the crosshead.

The guide rods 58 pass through guide openings 65 in guide bracket 30 and guide openings 66 in guide bracket 25, so that the guide rods are vertical and serve to guide the piston in moving up and down vertically. Around the guide rods and below the guide bracket 30 and above the guide bracket 25 and above the cylinder support bracket 26 are weights 67 having central vertical openings 68 through which the guide rods pass so that in one position the weights can move relative to the guide rods in a vertical direction. The weights near their upper ends at one side have latch screws 70 whose heads project out and are adapted to engage over latching projections 71 (suitably made of half nuts secured on the bracket) on latch bracket 28 to hold the weights without permitting their weight to bear on the piston.

The circumferences of the weights are guided by surfaces 72 on guide bracket 27. At the lower ends of the guide rods 58 and above the guide bracket 25, collars 73 held by set screws 74 are fixed on the guide rods, and when the latching screws 70 are lifted out of the latching projections 71 and the weights are rotated so that the screw heads 70 will not interfere, the weights are free to move down and apply their weight to the guide rods and so to the crosshead and to the piston, subjecting the sample to the pre-determined pressure for test.

In testing a sample according to the invention the cylinder is placed in the machine and a measured amount of sample, suitably cooked tortilla corn, is placed in the cylinder while the crosshead and the cylinder are held up by the latching ring 54 over the latching projection 55. Then the latching ring is released and the crosshead and cylinder are carefully and slowly lowered so that the starting load is applied to the sample without any impact. The weights are still held up by the latching projections 71. The observer records from the scale the initial position of the piston. Now the weights are released to rest on the collars 73 and apply their weight to the guide rods, crosshead and piston. This is done slowly and carefully so that no impact is involved. After a predetermined time another reading is made from the scale and the difference of the two readings calculated as the compressibility of the sample. In some cases it is preferred to make readings at periodic time intervals until the height of the piston is substantially constant.

EXAMPLE

The cylinder has a bore diameter of 4 cm, and a height of 20 cm.

When tested by the procedure of the invention, overcooked nixtamilized corn has a compressibility of 5 cm. Undercooked nixtamilized corn has a compressibility of 2 cm. Between these two extremes the observer can adjust his cooking to the level desired to produce a product conforming to the standards of the industry and the taste of the producer and user.

In filling the cylinder it is important to vibrate it constantly to obtain the maximum packing or minimum volume without application of pressure.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. A device to measure compressibility of soft materials comprising a loose vertical cylinder in which the sample is adapted to be contained, a piston fitting the cylinder above the sample, and adapted to subject the sample to a starting compression, a weight acting downwardly and in one position applying pressure to the piston, a crosshead connected to the piston, a guide rod positioned beside the piston and extending in the direction of its motion, a weight surrounding the guide rod and in one position moveable with respect to the guide rod, means for shifting the weight from an inoperative position in which it does not apply its weight to the piston to an operative position in which it applies its weight to the piston, latch means holding the weight so that its downward force is not exerted on the guide rod, and means permitting releasing the latch to make the weight bear on the guide rod.

2. A device for measuring the compressibility of soft materials comprising a base, an upstanding column, a cylinder bracket supported on the column, a cylinder supported by the cylinder bracket, a piston operating in the cylinder, a crosshead connected to the upper end of the piston and extending on each side of it, openings in the crosshead extending in the direction of the piston movement, an upper crosshead guide bracket on the column having openings in line with the crosshead openings, a lower crosshead guide bracket on the column having openings in line with the crosshead openings, crosshead guide rods extending through the crosshead openings and secured to the crosshead and extending through the openings in the upper and lower crosshead guide brackets, weights having openings surrounding the guide rods below the crosshead and in one position freely moveable up and down with respect to the guide rod, a weight latch bracket extending out from the column, latches on the weights in one position extending over the latch bracket and engaged by it, to bear the weight without applying it to the piston, and collars on the guide rods below the weights adapted to engage the weights when they are free from the latches and cause them to bear on the piston.

3. A device of claim 2, in combination with a piston latch bracket on the column and a piston latch connected to the crosshead and adapted in one position to hold up the piston and crosshead under the action of the latch engaging the piston latch bracket to permit the piston to be disassociated from the cylinder.

* * * * *